(No Model.)
E. C. FISHER.
CORN SHELLER.
No. 322,535. Patented July 21, 1885.
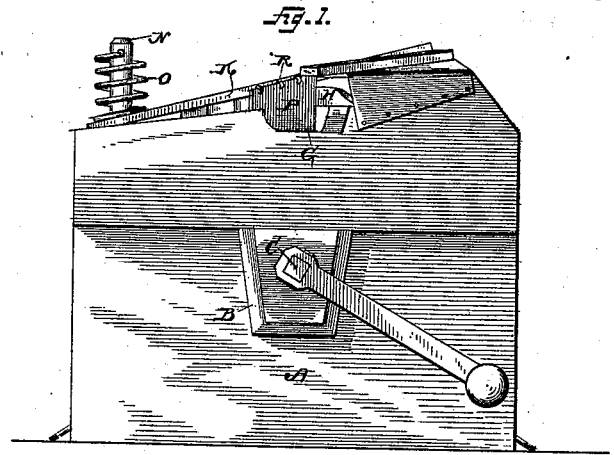
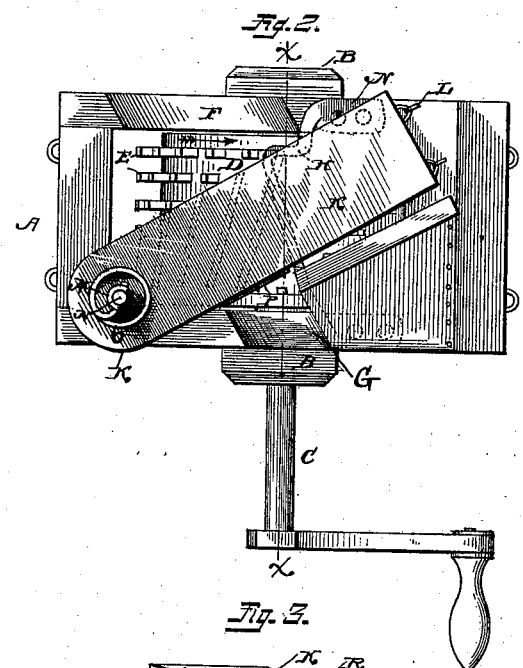
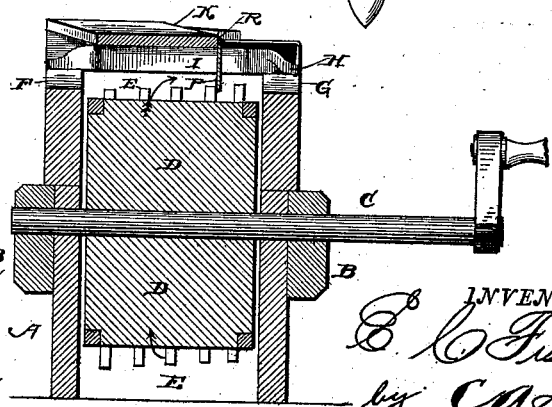
WITNESSES
N. W. Mortimer
E. G. Siggers
INVENTOR
E. C. Fisher
by C. A. Snow & Co.
Attorneys

United States Patent Office.

ELBEN CLARK FISHER, OF SISSONVILLE, WEST VIRGINIA.

CORN-SHELLER.

SPECIFICATION forming part of Letters Patent No. 322,535, dated July 21, 1885.

Application filed April 17, 1885. (No model.)

*To all whom it may concern:*

Be it known that I, ELBEN C. FISHER, a citizen of the United States, residing at Sissonville, in the county of Kanawha and State of West Virginia, have invented a new and useful Improvement in Corn-Shellers, of which the following is a specification, reference being had to the accompanying drawings.

My invention relates to an improvement in corn-shellers; and it consists in the peculiar construction and combination of devices that will be more fully set forth hereinafter, and particularly pointed out in the claim.

Figure 1 is a side elevation of a corn-sheller embodying my invention. Fig. 2 is a top plan view of the same. Fig 3 is a vertical section taken on the line $x$ $x$ of Fig. 2.

A represents a box or frame having bearing-blocks B in its sides, in which blocks is journaled the shaft C of a rotating cylinder, D. This cylinder is provided on its periphery with projecting teeth E, which are arranged in oblique lines extending across the face of the cylinder, as shown.

In one side of the upper edge of the box A is made an opening, F, which communicates with the upper side of the cylinder at one end thereof, and in the opposite side of the box, in its upper edge, is made a smaller opening, G, which is obliquely arranged with relation to the opening F, so as to be at an angle opposite to that at which the teeth are arranged upon the cylinder.

H represents a bearing-iron, which is secured from the upper side of the box and extends across said box, the bearing-face I of the bearing-iron being inclined obliquely to the cylinder in the direction opposite that to which the teeth of said cylinder are arranged.

K represents a presser-bar, which is hinged at one end to the box A, as at L, and has at its opposite end an opening, M, up through which extends a projecting spindle or rod, N, that is vertically secured in one corner of the box. A spring, O, is secured upon the upper end of the spindle and bears down upon the free end of the presser-bar.

To the outer end of the shaft C is attached a crank, which will be used when the machine is to be driven by hand-power; but a pulley may be substituted for the crank when it is desired to drive the machine by steam, water, or horse power.

On one side of the presser-bar K is hinged a valve, P, as at R, which valve normally depends vertically from the side of the presser-bar in a line with the opening G.

The ears of corn to be shelled are fed in through the opening F, and the cylinder is rotated in the direction indicated by the arrows. As the cylinder rotates its teeth catch against the grains of corn and rotate the ear, which must be held by the hand until the ear has reached the presser-bar and bears against the under side of the bar and against the face I of the bearing-iron. Continued rotation of the cylinder causes the ear to rotate rapidly and the grains of corn to be shelled therefrom and cast down into the box or frame, while the shelled portion of the corn-cob is moved toward the opening G, and, finally, when the corn has all been shelled from the cob, the cob is ejected, and the operation is repeated as before, with succeeding ears of corn. The function of the valve P is to prevent any of the corn from being thrown out of the box through the opening G. This valve lies horizontally on the upper side of the cob as the cob is passing across the face of the cylinder, and when the cob is ejected from the machine the valve drops into a vertical position and maintains this position until it is again raised by the succeeding ear of corn.

Having thus described my invention, I claim—

The combination of the box A, having the openings F and G arranged in an oblique line, the cylinder D, journaled in the box and having the rows of teeth E arranged obliquely across its face opposite to the line drawn between F and G, the bearing-iron H across the box, the presser-lever K, having one end hinged to the box, the spring-bearing on the free end of the presser-bar, and the valve P, hinged to the presser-bar on the side adjacent to the opening G, for the purpose set forth, substantially as described.

In testimony that I claim the foregoing as my own I have hereto affixed my signature in presence of two witnesses.

ELBEN CLARK FISHER.

Witnesses:
FRANKLIN FISHER,
T. M. CREEL.